United States Patent
Jones

[11] Patent Number: 6,064,300
[45] Date of Patent: May 16, 2000

[54] STROBE LIGHT WARNING SYSTEM FOR SCHOOL BUSSES

[76] Inventor: Clayton D. Jones, 10491 U.S. 27 P.O. Box 5, Dewitt, Mich. 48820

[21] Appl. No.: 09/267,021

[22] Filed: Mar. 11, 1999

[51] Int. Cl.7 .................................................. B60Q 1/26
[52] U.S. Cl. .......................... 340/433; 340/468; 340/471; 362/542; 307/10.8
[58] Field of Search .................................. 340/433, 468, 340/470, 471, 472, 473, 458; 180/271; 307/10.8; 362/542, 459

[56] References Cited

U.S. PATENT DOCUMENTS

| | | | |
|---|---|---|---|
| 3,902,159 | 8/1975 | Parolin | 340/433 |
| 4,117,454 | 9/1978 | Fabry et al. | 340/433 |
| 5,293,151 | 3/1994 | Rose | 340/433 |
| 5,467,071 | 11/1995 | Koenig | 340/433 |
| 5,604,480 | 2/1997 | Lamparter | 340/433 |
| 5,874,891 | 2/1999 | Lowe | 340/433 |

*Primary Examiner*—Daniel J. Wu
*Assistant Examiner*—Anh La

[57] ABSTRACT

A strobe light warning system for school busses for visually notifying a passerby of an emergency when an emergency door of a school bus is opened. The strobe light warning system for school busses includes a first pair of strobe lights adapted for mounting on opposite sides of an emergency door of a school bus. Each of the strobe lights is in communication with a power source of the school bus. A first switch contacts the emergency door. The first switch is electrically connected to the strobe lights such that the first switch closes a circuit when the emergency door is opened thereby permitting power to flow to the strobe lights.

11 Claims, 1 Drawing Sheet

STROBE LIGHT WARNING SYSTEM FOR SCHOOL BUSSES

BACKGROUND OF THE INVENTION

1. Field of the Invention

The present invention relates to warning light systems and more particularly pertains to a new strobe light warning system for school busses for visually notifying a passerby of an emergency when an emergency door of a school bus is opened.

2. Description of the Prior Art

The use of warning light systems is known in the prior art. More specifically, warning light systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,117,454; U.S. Pat. No. 5,510,763; U.S. Pat. No. 3,968,358; U.S. Pat. No. 2,603,700; U.S. Pat. No. 4,215,390; and U.S. Pat. No. Des. 282,010.

While these devices fulfill their respective, particular objectives and requirements, the aforementioned patents do not disclose a new strobe light warning system for school busses. The inventive device includes a first pair of strobe lights adapted for mounting on opposite sides of an emergency door of a school bus. Each of the strobe lights is in communication with a power source of the school bus. A first switch contacts the emergency door. The first switch is electrically connected to the strobe lights such that the first switch closes a circuit when the emergency door is opened thereby permitting power to flow to the strobe lights.

In these respects, the strobe light warning system for school busses according to the present invention substantially departs from the conventional concepts and designs of the prior art, and in so doing provides an apparatus primarily developed for the purpose of visually notifying a passerby of an emergency when an emergency door of a school bus is opened.

SUMMARY OF THE INVENTION

In view of the foregoing disadvantages inherent in the known types of warning light systems now present in the prior art, the present invention provides a new strobe light warning system for school busses construction wherein the same can be utilized for visually notifying a passerby of an emergency when an emergency door of a school bus is opened.

The general purpose of the present invention, which will be described subsequently in greater detail, is to provide a new strobe light warning system for school busses apparatus and method which has many of the advantages of the warning light systems mentioned heretofore and many novel features that result in a new strobe light warning system for school busses which is not anticipated, rendered obvious, suggested, or even implied by any of the prior art warning light systems, either alone or in any combination thereof.

To attain this, the present invention generally comprises a first pair of strobe lights adapted for mounting on opposite sides of an emergency door of a school bus. Each of the strobe lights is in communication with a power source of the school bus. A first switch contacts the emergency door. The first switch is electrically connected to the strobe lights such that the first switch closes a circuit when the emergency door is opened thereby permitting power to flow to the strobe lights.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new strobe light warning system for school busses apparatus and method which has many of the advantages of the warning light systems mentioned heretofore and many novel features that result in a new strobe light warning system for school busses which is not anticipated, rendered obvious, suggested, or even implied by any of the prior art warning light systems, either alone or in any combination thereof.

It is another object of the present invention to provide a new strobe light warning system for school busses which may be easily and efficiently manufactured and marketed.

It is a further object of the present invention to provide a new strobe light warning system for school busses which is of a durable and reliable construction.

An even further object of the present invention is to provide a new strobe light warning system for school busses which is susceptible of a low cost of manufacture with regard to both materials and labor, and which accordingly is then susceptible of low prices of sale to the consuming public, thereby making such strobe light warning system for school busses economically available to the buying public.

Still yet another object of the present invention is to provide a new strobe light warning system for school busses which provides in the apparatuses and methods of the prior art some of the advantages thereof, while simultaneously overcoming some of the disadvantages normally associated therewith.

Still another object of the present invention is to provide a new strobe light warning system for school busses for visually notifying a passerby of an emergency when an emergency door of a school bus is opened.

Yet another object of the present invention is to provide a new strobe light warning system for school busses which includes a first pair of strobe lights adapted for mounting on opposite sides of an emergency door of a school bus. Each of the strobe lights is in communication with a power source of the school bus. A first switch contacts the emergency door. The first switch is electrically connected to the strobe lights such that the first switch closes a circuit when the emergency door is opened thereby permitting power to flow to the strobe lights.

Still yet another object of the present invention is to provide a new strobe light warning system for school busses that automatically turns on when the emergency door of the school bus is opened. That way, if the driver is injured, the lights will still start flashing when the passengers attempt an escape.

Even still another object of the present invention is to provide a new strobe light warning system for school busses that reduces the risk of a child being hit by a car as he or she flees an accident involving the bus.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
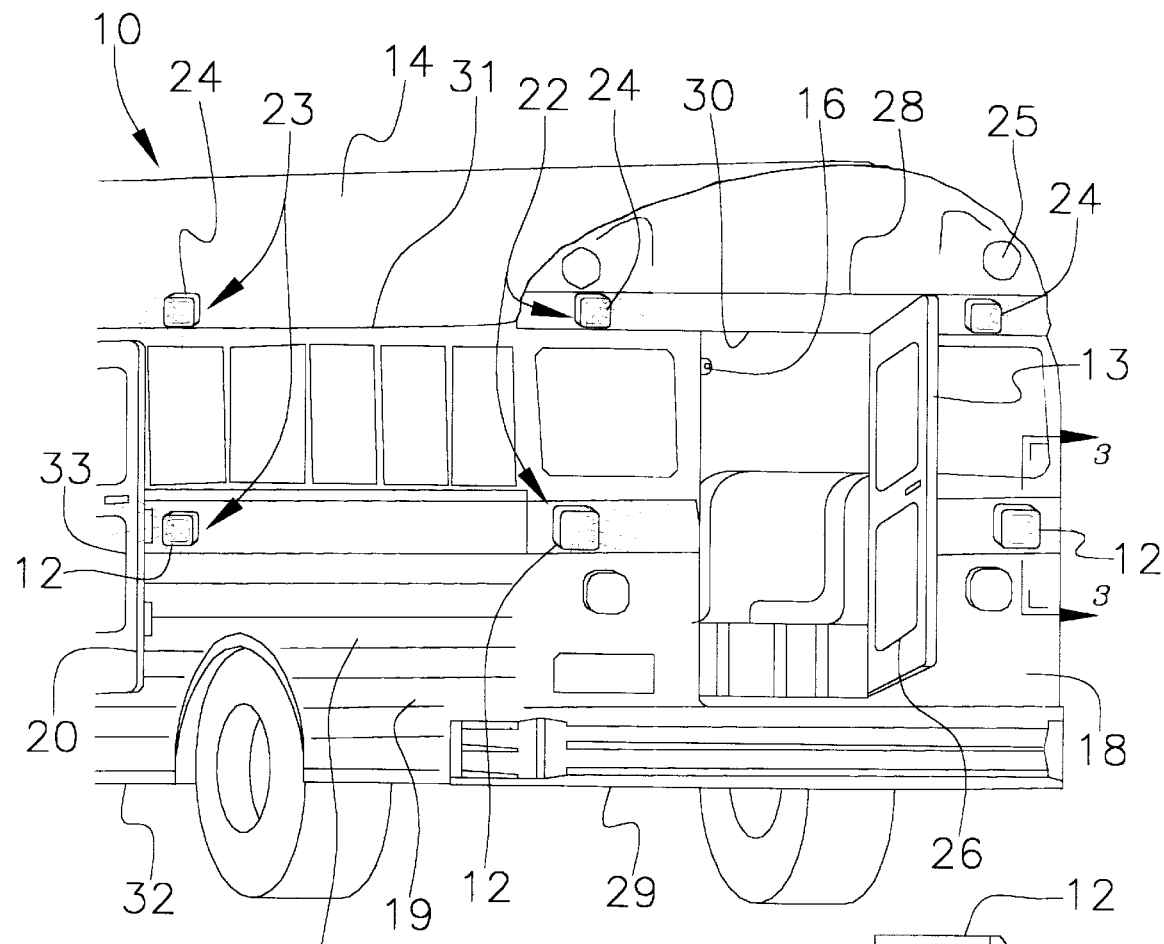
FIG. 1 is a schematic perspective view of a new strobe light warning system for school busses according to the present invention.
Figure 3:
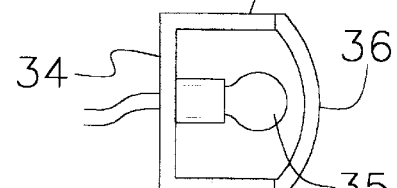
FIG. 3 is a schematic cross sectional view of the present invention taken from line 3—3 of FIG. 1.
Figure 2:
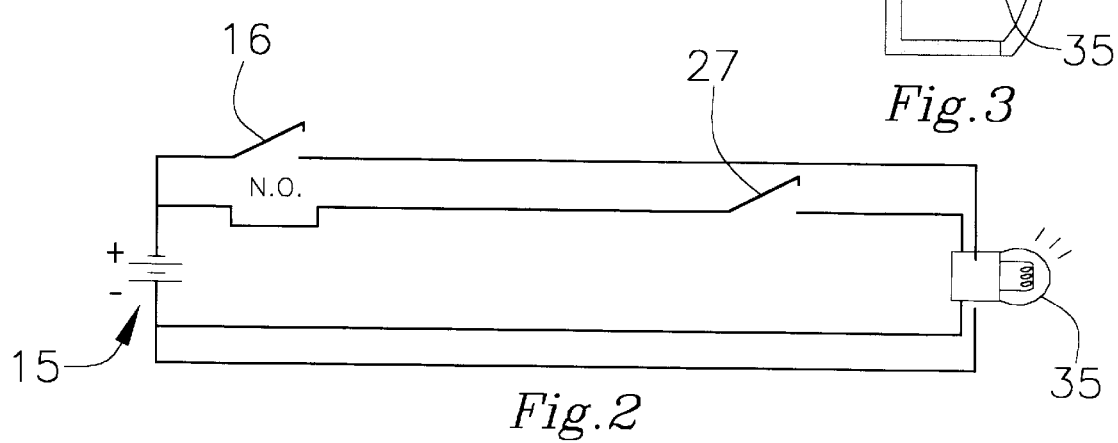
FIG. 2 is a schematic diagram representing a wiring scheme of the present invention.

With reference now to the drawings, and in particular to FIGS. 1 through 3 thereof, a new strobe light warning system for school busses embodying the principles and concepts of the present invention and generally designated by the reference numeral 10 will be described.

As best illustrated in FIGS. 1 through 3, the strobe light warning system for school busses 10 generally comprises a first pair of strobe lights adapted for mounting on opposite sides of an emergency door 13 of a school bus 14. Each of the strobe lights is in communication with a power source 15 of the school bus. A first switch 16 contacts the emergency door. The first switch is electrically connected to the strobe lights such that the first switch closes a circuit when the emergency door is opened thereby permitting power to flow to the strobe lights.

The school bus has a front (not shown), a back 18, and a chassis 19 extending between the front and back. The back of the school bus has a first emergency door 13 positioned centrally therein. Alternatively or in combination with the first emergency door, the chassis of the school bus may have a second emergency door 20 positioned in a lateral side 21 of the chassis.

Preferably, a first strobe light system 22 is positioned towards the first emergency door. Alternatively or in combination with the first strobe light system, a second strobe light system 23 may be positioned towards the second emergency door.

Each of the strobe light systems comprises a first pair of strobe lights positioned on opposite sides of the associated emergency door. Optionally, a second pair of strobe lights 24 may be positioned above the associated emergency door on opposite sides of the door towards the flashers 25. Such placement would prevent the emergency door from covering one of the strobe lights when opened, especially important if the lower window 26 of the emergency door is dirty.

Each of the strobe lights is in communication with a power source of the school bus. A first switch is positioned on a door jamb of the door for contacting the emergency door. The first switch is electrically connected to the strobe lights such that the first switch closes a circuit when the emergency door is opened, thereby permitting power to flow to the strobe lights. The first switch will turn the strobe light on, even though the driver is injured and unable to turn on the second switch (below) when the door is opened. The operation of the first switch can be compared to the switch that turns a light on inside a refrigerator when the refrigerator door is opened.

Preferably, a second switch 27 that is operable by a driver is electrically connected to the strobe lights such that the second switch closes a circuit thereby permitting power to flow to the strobe lights. This permits the driver to start the strobe lights flashing to warn oncoming motorists of an emergency even before the emergency door is opened.

Preferably, the first and second pairs of strobe lights are positioned towards the first emergency door are positioned on the back of the school bus towards lateral sides of the chassis. Ideally, the strobe lights positioned towards the first emergency door are positioned on the back between about 3 and 10 inches from the lateral sides of the chassis so that the strobe lights are less likely to be obstructed from view by the children escaping the bus. This also makes the width of the bus discernable, particularly important in a storm or blizzard condition. Furthermore, this ensures that one of the strobe lights is visible in event of a rollover of the school bus. Though one strobe light may be obstructed from view by grass or snow in the ditch, the other strobe light would be visible.

Also ideally, the first pair of strobe lights positioned towards the first emergency door are positioned at a point about midway between a top 28 and a bottom 29 of the back of the school bus. The first emergency door has a lower window therein for permitting view of a strobe light covered by the first emergency door when the first emergency door is open.

Preferably, each of the first switches is positioned towards an upper edge 30 of the associated door jamb for safety so that it is out of the way when the passengers flee through the door. This placement is important, since it is probable that the passengers experiencing the emergency will rush the door in a frenzy with little concern for avoiding obstructions.

Also preferably, the first pair of strobe lights positioned towards the second emergency door are positioned at a point about midway between a top 31 and a bottom 32 of the chassis of the school bus. The second emergency door should have a lower window 33 therein for permitting view of a strobe light covered by the second emergency door when the second emergency door is open.

Preferably, each of the strobe lights comprises a protective outer housing 34, a bulb 35 disposed in the housing, and a translucent covering 36 extending across an opening of the outer housing.

Ideally, the translucent covering curves outwardly from the outer housing and directs portions of light outwardly at an angle of 90 degrees from a peripheral sidewall of said outer housing so that flashing light is visible from beside said strobe lights. Also ideally, the translucent covering magnifies visible light passing through it so that the light is visible from farther distances.

The preferred dimensions for the outer casing of the strobe light is about three inches by three inches square by about 1 to 2 inches deep.

In use, the first switch closes when the emergency door opens, thus permitting power to flow to the strobe lights. As the passengers exit the emergency door of the bus during an emergency, the strobe lights flash to alert approaching motorists of the danger. The driver may also activate the second switch to start the strobe lights flashing.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A warning system for a school bus having a front, a back, a chassis extending between the front and back, a set of operating lights and an emergency door, the warning system comprising:
    a first pair of strobe lights adapted for mounting on opposite sides of an emergency door of a school bus;
    each of said strobe lights being in communication with a power source of said school bus; and
    a first switch contacting said emergency door, said first switch being electrically connected to said strobe lights such that said first switch closes a circuit when said emergency door is opened thereby permitting power to flow to said strobe lights, said first switch and said strobe lights being electrically connected independently of the set of operating lights of the bus for preventing failure in operation of said strobe lights due to a failure in operation of the operating lights of the bus under emergency conditions.

2. The warning system of claim 1, further comprising a second pair of strobe lights being positioned above said emergency door.

3. The warning system of claim 1, further comprising a second switch being operable by a driver, said second switch being electrically connected to said strobe lights such that said second switch closes a circuit thereby permitting power to flow to said strobe lights.

4. The warning system of claim 1, wherein said strobe lights positioned towards said emergency door are positioned on said back of said school bus towards lateral sides of said chassis.

5. The warning system of claim 4, wherein said strobe lights positioned towards a first emergency door are positioned on said back between about 3 and 10 inches from lateral sides of a chassis of said bus.

6. The warning system of claim 1, wherein said first pair of strobe lights are positioned at a point about midway between a top and a bottom of a back of said school bus.

7. The warning system of claim 1, wherein said first switch is positioned towards an upper edge of a door jamb of said school bus.

8. The warning system of claim 1, wherein each of said strobe lights comprises a protective outer housing, a bulb disposed in said housing, and a translucent covering extending across an opening of said outer housing.

9. The warning system of claim 8, wherein said translucent covering curves outwardly from said outer housing and directs portions of light outwardly at an angle of 90 degrees from a peripheral sidewall of said outer housing.

10. The warning system of claim 8, wherein said translucent covering magnifies visible light passing therethrough.

11. A school bus with warning system, comprising
    a school bus having a front, a back, and a chassis extending between said front and back;
    said back of said school bus having a first emergency door positioned centrally therein;
    said chassis of said school bus having a second emergency door positioned in a lateral side thereof;
    a plurality of operating lights being mounted on said chassis of said bus for indicating the normal driving operations performed by a driver of said bus;
    a first strobe light system being positioned towards said first emergency door;
    a second strobe light system being positioned towards said second emergency door;
    each of said strobe light systems comprising:
        a first pair of strobe lights being positioned on opposite sides of said emergency door;
        a second pair of strobe lights being positioned above said emergency door on opposite sides of the door towards the flashers for preventing the emergency door from covering one of the strobe lights when opened;
        each of said strobe lights being in communication with a power source of said school bus;
        a first switch being positioned on a door jamb for contacting said emergency door, said first switch being electrically connected to said strobe lights such that said first switch closes a circuit when said emergency door is opened thereby permitting power to flow to said strobe lights; and
        a second switch being operable by a driver, said second switch being electrically connected to said strobe lights such that said second switch closes a circuit thereby permitting power to flow to said strobe lights;
    said strobe lights positioned towards said first emergency door being positioned on said back of said school bus towards lateral sides of said chassis;
    wherein said strobe lights positioned towards said first emergency door are positioned on said back between about 3 and 10 inches from said lateral sides of said chassis for making the width of the bus more discernable under low visibility conditions;

wherein said first pair of strobe lights positioned towards said first emergency door are positioned at a point about midway between a top and a bottom of said back of said school bus, said first emergency door having a lower window therein for permitting view of a strobe light covered by said first emergency door when said first emergency door is open;

wherein each of said first switches is positioned towards an upper edge of said door jamb;

wherein said first pair of strobe lights positioned towards said second emergency door are positioned at a point about midway between a top and a bottom of said chassis of said school bus, said second emergency door having a lower window therein for permitting view of a strobe light covered by said second emergency door when said second emergency door is open;

each of said strobe lights comprising a protective outer housing, a bulb disposed in said housing, and a translucent covering extending across an opening of said outer housing;

wherein said translucent covering curves outwardly from said outer housing and directs portions of light outwardly at an angle of 90 degrees from a peripheral sidewall of said outer housing;

wherein said translucent covering magnifies visible light passing therethrough;

wherein said first strobe light system and said second strobe light system being electrically connected independently of the set of operating lights of the bus for preventing failure in operation of said first strobe light system and said second strobe light system due to a failure in operation of the operating lights of the bus.

* * * * *